R. S. Elliott.
Dredger.
Nº 95,213. Patented Sept. 28, 1864.

Witnesses.
Inventor:

United States Patent Office.

R. S. ELLIOTT, OF ST. LOUIS, MISSOURI.

Letters Patent No. 95,213, dated September 28, 1869.

IMPROVED HYDRAULIC DREDGING-MACHINE.

The Schedule referred to in these Letters Patent and making part of the same.

*To all whom it may concern:*

Be it known that I, R. S. ELLIOTT, of the city of St. Louis, in the county of St. Louis, and State of Missouri, have invented a new and improved Hydraulic Dredging-Machine; and I do hereby declare that the following is a full, clear, and exact description thereof, which will enable others skilled in the art to make and use the same, reference being had to the accompanying drawing, forming part of this specification.

Figure 1:
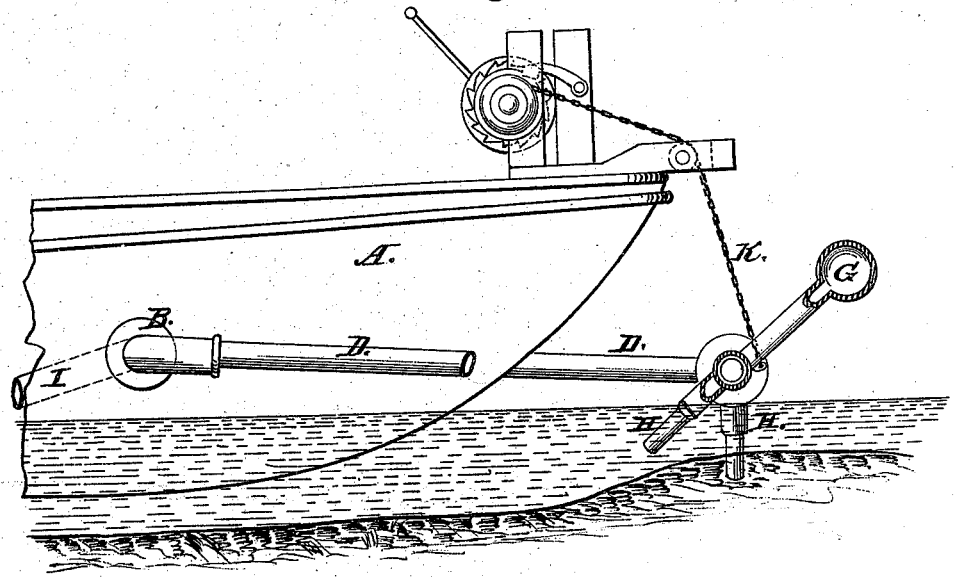
Figure 1 represents an elevation of one form of apparatus such as I propose to use.
Figure 2:
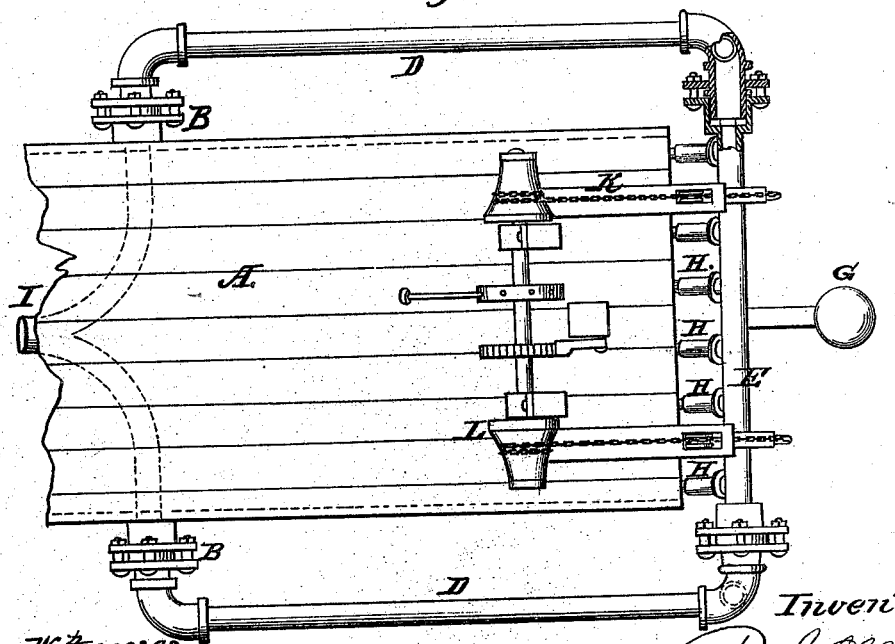
Figure 2 represents a plan view of the same.

Some parts are shown broken in both figures.

Similar letters of reference indicate corresponding parts.

I propose to employ water-jets or currents, to be discharged, through a greater or less number of nozzles, upon sand or other similar substances at the bottoms of rivers, harbors, &c., for stirring up and mixing the same with the water, so that it may be floated away; and this I propose to accomplish by any suitable system of pipes and forcing-apparatus, applied to a vessel, float, or other article, in any manner suitable for the purpose.

In this example, I have represented a scow, A, having pipes B projecting from the sides, near one end, to which the pipes D, leading to the nozzle-pipe E, are connected, so as to swing up or down, for immersing the nozzles H, connected to the pipe E, or to raise them above the water.

The said nozzles are flexibly connected to the pipe E, to prevent damage from striking the bottom.

The said nozzle-pipe E is also connected to the pipes D, so as to turn freely on its axis, and is provided with an air or cushion-chamber, G.

To the said pipe E, I propose to connect any preferred number of nozzles, H, for discharging the water, at intervals, along the space covered by the pipe; and for forcing the water, I employ any kind of power to force it into the said pipes at I.

The nozzles may be adjusted to discharge the water at any required angle from the plane of the pipe E, and may be used to urge the vessel forward while operating on the bar.

When discharging the water in this manner, the boat or vessel should be moved at a moderate speed over the bar to be removed, by which better results will be produced than when remaining too long in one position.

For elevating or lowering the pipe E, a windlass and chain may be employed, as represented at L K; or a ratchet-bar and cog-wheel may be employed.

In actual work, the boat or vessel with my apparatus ought to come up to and over the bar against the current, with all her jets working, and drop back over the bar, still having the jets in full operation. In harbors, the flow of the tide outward will be taken advantage of.

Having thus described my invention,

What I claim as new, and desire to secure by Letters Patent, is—

The arrangement of the pipes B D E and nozzles H, all substantially as specified.

R. S. ELLIOTT.

Witnesses:
H. W. HOUGH,
JAMES A. BARTLETT.